US 6,735,365 B2

(12) United States Patent
Carberry et al.

(10) Patent No.: US 6,735,365 B2
(45) Date of Patent: May 11, 2004

(54) FUSED FIBER INTERLEAVER

(75) Inventors: Joel P. Carberry, Horseheads, NY (US); Qi Wu, Eatontown, NJ (US)

(73) Assignee: Corning, Incorporated, Corning, NY (US)

( * ) Notice: Subject to any disclaimer, the term of this patent is extended or adjusted under 35 U.S.C. 154(b) by 91 days.

(21) Appl. No.: 10/124,624

(22) Filed: Apr. 16, 2002

(65) Prior Publication Data

US 2003/0194184 A1 Oct. 16, 2003

(51) Int. Cl.⁷ .................................. G02B 6/26
(52) U.S. Cl. ........................ 385/39; 385/43; 385/48
(58) Field of Search .................... 385/39, 14, 24, 385/27, 42, 43, 48; 359/497, 495; 398/9, 79

(56) References Cited

U.S. PATENT DOCUMENTS

| 6,031,948 A | 2/2000 | Chen ..................... 385/24 |
| 6,240,221 B1 | 5/2001 | Thompson ................. 385/14 |
| 6,282,342 B1 * | 8/2001 | Berkey et al. ............. 385/43 |

* cited by examiner

Primary Examiner—Phan T. H. Palmer
(74) Attorney, Agent, or Firm—Volentine Francos, PLLC (57) ABSTRACT

In accordance with an exemplary embodiment of the present invention, an optical interleaver/deinterleaver includes a substrate having at least one window therein. The interleaver/deinterleaver further includes a first optical waveguide and a second optical fiber, which are disposed over a substrate. The first and second optical waveguides are coupled together at at least two locations to form optical couplers at each of the locations. The first optical waveguide has a first length between the two locations, and the second optical waveguide has a second length between the two locations wherein the first length is smaller than the second length. Illustratively, the first optical waveguide is disposed over the window, so that the window is along the first length of the first optical fiber. In accordance with another exemplary embodiment of the present invention, a method of interleaving/deinterleaving optical signals includes providing a first optical waveguide and a second optical waveguide, which is coupled to the first optical fiber at at least two locations. The method further includes adjusting a length of the second optical waveguide to coarsely adjust channel separation, and applying laser energy to the first optical waveguide to finely adjust the channel separation.

25 Claims, 5 Drawing Sheets

FUSED FIBER INTERLEAVER

FIELD OF THE INVENTION

The present invention relates generally to optical communications, and specifically to a fused fiber interleaver/deinterleaver.

BACKGROUND OF THE INVENTION

Optical transmission systems, including optical fiber communication systems, have become an attractive alternative for carrying voice and data at high speeds. In addition to the pressure to improve the performance of optical communication systems, there is also increasing pressure on each segment of the optical communication industry to reduce costs associated with building and maintaining an optical network.

One technology used in optical communication systems is wavelength division multiplexing (WDM). As is well known, WDM pertains to the transmission of multiple signals (in this case optical signals) at different wavelengths down a single waveguide, providing high-channel capacity. Typically, the optical waveguide is an optical fiber.

For purposes of illustration, according to one International Telecommunications Union (ITU) grid a wavelength band from 1530 nm to 1565 nm is divided up into a plurality of wavelength channels, each of which have a prescribed center wavelength and a prescribed channel bandwidth. The spacing between the channels is also prescribed by the ITU grid, and is in units of frequency or wavelength.

For example, one ITU channel grid has a channel spacing requirement of 100 GHz (in this case the channel spacing is referred to as frequency spacing), which corresponds to channel center wavelength spacing of 0.8 nm. With 100 GHz channels spacing, channel "n" would have a center frequency 100 GHz less than channel "n+1" (or channel n would have a center wavelength 0.8 nm greater than channel n+1). The chosen channel spacing may result in 40, 80, 100, or more wavelength channels across a particular passband. While transmission of information via an optical medium has afforded significant improvements in the transmission of voice and data, the increased demand for capacity may still adversely impact signal quality of the transmitted optical signal. For example, the number of channels that may be carried in a signal optical fiber is limited by cross talk, narrow operational bandwidth of amplifiers, and optical waveguide non-linearities. The more the information that is sent over a particular transmission medium, the greater the number of channels that are needed. It follows, that due to bandwidth considerations, the larger the number of channels, the closer the separation between adjacent channels must be. In an attempt to address the need for increased channel density in WDM Not only is it difficult to interleave signals with ever-decreasing channel spacing, but also it is difficult to deinterleave the channels at the receive-end. To this end, in order to preserve the integrity of the signal at the receiver end of the communication link, cross talk in the form of received channel overlap must be minimized. As can be appreciated, the closer the channel spacing is, the more difficult it is to prevent inter-channel interference.

What is needed, therefore, is an interleaver/deinterleaver apparatus and corresponding method of its use, which addresses the needs of the optical communications industry, while overcoming at least the shortcomings of the conventional approaches described above.

SUMMARY OF THE INVENTION

In accordance with an exemplary embodiment of the present invention, an optical interleaver/deinterleaver includes a substrate having at least one window therein. The interleaver/deinterleaver further includes a first optical waveguide and a second optical fiber, which are disposed over a substrate. The first and second optical waveguides are coupled together at at least two locations forming optical couplers at each of the locations. The first optical waveguide has a first length between the two locations, and the second optical waveguide has a second length between the two locations wherein the first length is smaller than the second length. Illustratively, the first optical waveguide is disposed over the window, so that the window is along the first length of the first optical fiber.

In accordance with another exemplary embodiment of the present invention, a method of interleaving/deinterleaving optical signals includes providing a first optical waveguide and a second optical waveguide, which is coupled to the first optical fiber at at least two locations. The method further includes adjusting a length of the second optical waveguide to coarsely adjust channel separation, and applying laser energy to the first optical waveguide to finely adjust the channel separation.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Figure 1:
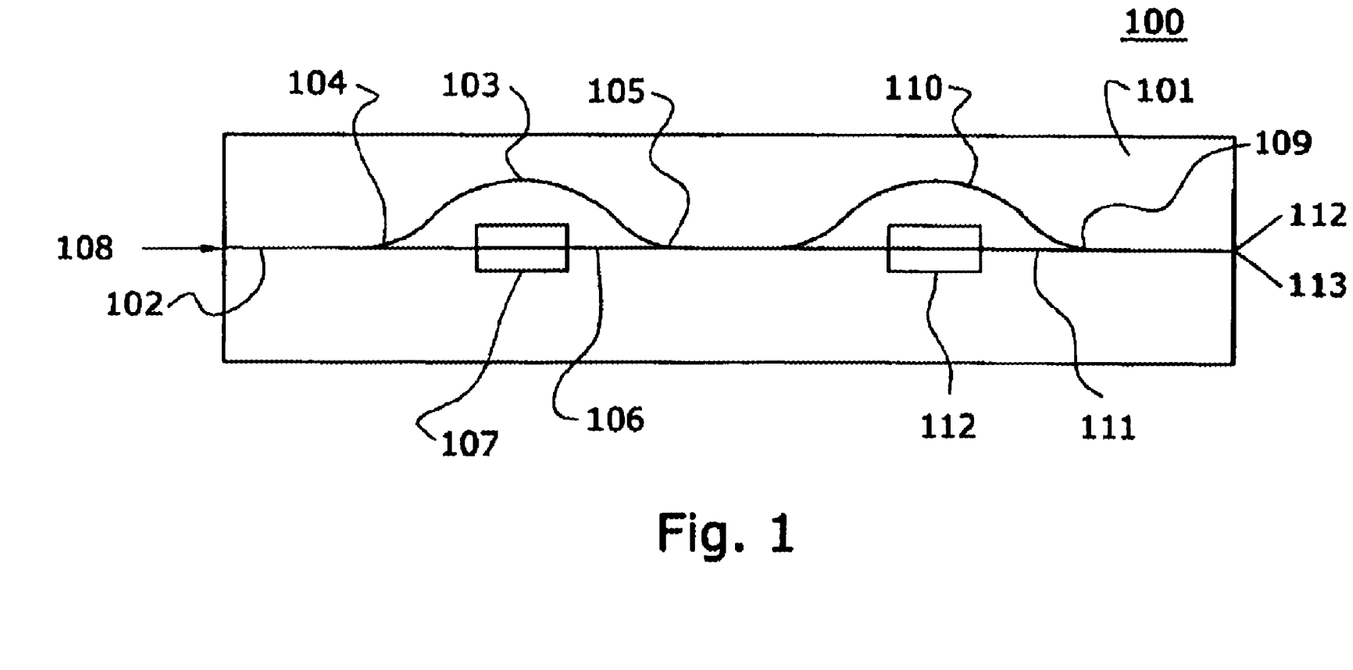
FIG. 1 is a perspective view of an interleaver/deinterleaver in accordance with an exemplary embodiment of the present invention.

FIG. 1 shows an interleaver/deinterleaver apparatus 100 (hereinafter referred to as interleaver 100) in accordance with an exemplary embodiment of the present invention. For purposes of clarity of discussion, the functional operation of the interleaver will be described in its deinterleaving capacity. Of course, from the principle of reciprocity in physical optics, the device could function as an interleaver. Moreover, it is noted that the use of optical fibers is also illustrative, and other waveguides, such as planar waveguides may be used in carrying out the present invention.

The interleaver 100 is disposed over a substrate 101. A first optical fiber 102 is disposed over the substrate 101. An input optical signal 108 is coupled to the first optical fiber 102. The input optical signal 108 may be a multiplexed optical signal having channels 1, 2, . . . , n, with respective channel center wavelengths of $\lambda_1, \lambda_2, \ldots, \lambda_n$. Illustratively, the multiplexed optical signal is a wavelength division multiplexed (WDM) optical signal or a dense WDM (DWDM) optical signal, although the channeling of the optical signals could be effected by other techniques known to one having ordinary skill in the art.

The input optical signal 108 traverses the first optical fiber 102. At a first location, a first optical coupler 104 is formed. The first optical coupler 104 is formed at the first location from the first optical fiber 102 and the second optical fiber 103, and illustratively is a fused biconical tapered coupler. To wit, optical coupler 104 is illustratively formed from the fusion of the first optical fiber 102 and the second optical fiber 103 along an interior portion by known techniques.

In the present exemplary embodiment, the first and second optical fibers 102 and 103, respectively, are identical optical fibers. The input optical signal 108, having n-channels, is split at the optical coupler 104 with approximately an equal amount of optical power going through each optical fiber. Of course, by alteration of the coupling ratio of the first optical coupler 104, different proportions of optical energy can be made to traverse the first and second optical fibers 102 and 103, respectively. As will become clearer as the present description proceeds, the coupling ratio can be selected to effect a substantially "flat-top" transmittance for each deinterleaved channel. Nonetheless, regardless of the optical power which traverses either optical fiber, all n-channels traverse both the first optical fiber 102 and the second optical fiber 103.

In the illustrative embodiment shown in FIG. 1, the first and second optical fibers 102 and 103, respectively, have different optical path lengths (OPL). This results in a Mach-Zehnder interferometer. Because of the difference in the OPL of the first and second optical fibers, a phase delay between the optical signals traversing the first and second optical fibers 102 and 103, respectively, is realized at a second location where a second optical coupler 105 is disposed. As will be described in further detail as the present description proceeds, this phase delay enables selective constructive and destructive interference to effect an increase in the channel spacing between the n-channels of the optical signal. Of course, if used to interleave a plurality of optical channels, this selective constructive and destructive interference enables the channels to be more closely spaced.

It is noted that the phase shift due to the OPL difference may be effected in a variety of ways. For example, as can be seen in FIG. 1, the actual length of the second optical fiber 103 between the first and second couplers 104 and 105, respectively, may be greater than the length 106 of the first optical fiber 102 between the couplers. Moreover, the phase shift could be caused by the different phase velocities at which the optical signals traverse the respective first and second optical fibers if the refractive indices of the first and second optical fibers 102 and 103, respectively, differ. Finally, it is noted that the phase shift may be realized via a combination of these affects.

For purposes of illustration, the channel spacing (which may be in units of frequency, wavelength or period) between the individual channels in the input optical signal 108 may be chosen to match an ITU grid. For example, the channel spacing may be 400 GHz, 200 GHz, 100 GHz, 50 GHz, 25 GHz or 12.5 GHz corresponding to channel center wavelength spacings of 3.2 nm, 1.6 nm, 0.8 nm, 0.4 nm, 0.2 nm or 0.1 nm, respectively. It is particularly beneficial to increase the channel spacing by deinterleaving the optical channels. For example, illustrative wavelengths in the C-band, which is typically in the range of approximately 1528 nm to approximately 1560 nm, and the L-band, which has typical channel wavelengths from approximately 1565 nm to approximately 1620 nm may have center frequency/wavelength spacings such as those referenced above, and these may be increased by virtue of the present invention. Desirably, when the optical signals which traverse the first length 106 of the first optical fiber 102 and the second optical fiber 103 are coupled at second coupler 105, this spacing is increased by an integer multiple of the channel spacing between the channels of the input optical signal 108.

Quantitatively, in accordance with an exemplary embodiment of the present invention, in the input optical signal 108, the channel spacing between channel 1, which has a center wavelength of $\lambda_1$, and channel 2 which has a center wavelength of $\lambda_2$ may be:

$$\Delta\lambda_{1-2} = \lambda_2 - \lambda_1 \quad (1)$$

It may be desirable to choose the various elements of the interleaver of the exemplary embodiment of FIG. 1 such that this channel spacing $\Delta\lambda$ is doubled:

$$\Delta\lambda_{1-2}' = 2\Delta\lambda_{1-2} \quad (2)$$

It can be shown that the channel spacing upon emergence from the second optical coupler 105 may be given by:

$$\Delta\lambda' = \frac{\lambda^2}{(n_2 L_2 - n_1 L_1)} \quad (3)$$

where $\lambda$ is the central wavelength of the channel with maximum transmission, $n_1$ and $n_2$ are the indices of refraction of the first optical fiber 102 and the second optical fiber 103, respectively; and $L_1$ is the length 106 and $L_2$ is the length of the second optical fiber 103. It is noted, of course, that further variation of the parameters $n_1$, $n_2$, $L_1$ and $L_2$ can further increase in the channel spacing.

In the presently described exemplary embodiment, the channel spacing of the input optical signal 108 is effectively doubled upon emergence from the second coupler 105, to facilitate further processing of the optical signal for reasons described above. For purposes of illustration and not limitation, if the channel spacing of input optical signal conformed to a particular ITU grid in which the center frequencies of the individual channels were separated 100 GHz, the channel center wavelengths would be spaced 0.8 nm apart. To wit, channel n would have a center wavelength, which is 0.8 nm greater than the center wavelength of channel n+1. Due to the phase delay introduced by the differential between the length $L_1$ and the length $L_2$, as well as any index variations induced in first optical fiber 102 and/or second optical fiber 103, the wavelength spacing at the output of second coupler 105 is doubled to 1.6 nm, or 200 GHz. Of course, this is merely illustratively, as the channel spacings may be varied to accommodate the particular system in which the optical apparatus 100 is included. Moreover, as will become more clear as the present description proceeds, suitable adjustment of the coupling ratio at the first coupler 104 will foster a more "flat-top" transmittance for each channel; and a second/cascaded deinterleaver may be utilized to further space the channels, as well as to foster a "flat-top" transmittance.

As discussed, in the exemplary embodiment shown in FIG. 1, the channel separation that ultimately enables the deinterleaving by the interleaver 100 results from the phase delay created by the differential in the optical path lengths of the input optical signal 108 which has been split by the first coupler 104. It can be shown that at second coupler 105, the transmittance of a particular channel emerging from an output optical fiber (e.g. output optical fiber 110), is given by:

$$T_1 = \frac{1}{2}[1 + \cos(\Phi_0 + 2\pi\upsilon\tau)] \quad (3a)$$

whereas the transmittance of a particular channel emerging from another output optical fibers (e.g., output optical fiber 111), is given by:

$$T_2 = 1 - T_1 = \frac{1}{2}[1 - \cos(\Phi_0 + 2\pi\upsilon\tau)] \quad (3b)$$

where $\upsilon$ is the optical frequency of a particular channel; $\Phi_0$ is a phase constant; $\Pi$ is a constant; and $\tau$ is the temporal delay at second coupler 105 of the particular channel split at the first coupler 104, and is given by:

$$\tau = \frac{(n_2 L_2 - n_1 L_1)}{c} \quad (4)$$

where c is the speed of light in a vacuum. Of course, the total transmittance for the optical signal at second coupler 105 would be the sum of the transmittances given by eqns. (3a) and 3(b) for each individual channel of the optical signal. Moreover, eqns. (3a) and (3b) shows the complementary nature of the outputs of the illustrative interleaver/deinterleaver, where even and odd channels are split into separate fiber outputs.

The temporal delay, $\tau$, at the second coupler 105 is in the inverse of the frequency period, or spacing of the transmission coefficient given by equation (3). Accordingly, each of the n channels has a frequency spacing given by $$\left(\frac{1}{\tau}\right),$$

which is also known as the free spectral range (FSR).

It follows that suitable selection of the indices of refraction ($n_1$ and $n_2$) as well as the lengths of the optical fibers ($L_1$ and $L_2$) enables the selection of a desired channel spacing. As referenced previously, the selection of the length 106 ($L_1$) of the first optical fiber 102, as well as the length of the second optical fiber 103 is useful in the selection of the wavelength/channel spacing as set forth quantitatively above. In accordance with an exemplary embodiment of the present invention, the coarse tuning may be set through the appropriate selection of the lengths $L_1$, $L_2$ of first and second optical fibers 102 and 103, respectively.

It is noted that errors of in the lengths $L_1$ and $L_2$ of first and second optical fibers, 102 and 103, respectively, may be caused by measurement errors, and may be as much as ±1 mm. This corresponds to an error in FSR of about ±46 GHz, which is unacceptable. However, one of these optical fibers may be elongated under high temperature (softening temperature, again delivered by a $CO_2$ laser, for example) to compensate the error, using the feedback from the FSR measured in real-time. The accuracy of the tuning is limited by the measurement accuracy of the wavelength, which is less than 1 GHz. The accuracy of the frequency spacing/FSR can be further improved by measuring the wavelength comb over a wide channel band. Therefore the tolerance of the frequency spacing/FSR may be as small as +0.01 GHz.

In accordance with an exemplary embodiment of the present invention, fine-tuning is effected through variation of the index of refraction of the first optical fiber 102 which is exposed via window 107 in the substrate 101. To this end, in the present exemplary embodiment, the window 107 enables the application of laser light to effectively alter the index of refraction of the optical fiber disposed thereover. Illustratively, a $CO_2$ laser is used to selectively irradiate the exposed section of the first optical fiber 102 via window 107, which results in its heating, and variation of the index of refraction, $n_1$.

The use of the laser to alter the index of refraction is particularly advantageous compared to conventional methods used to thermally vary the index of refraction of a waveguide. For example, the use of the laser in accordance with an exemplary embodiment allows for temperature variation in the range of approximately 20° C. to approximately 1800° C. A maximum index variation of approximately 0.001 may be effected by this technique. Moreover, the temperature may be controlled using the feedback from the spectral transmission measurement of the device during the fabrication process, thereby ensuring that the frequencies of the device accurately line up with the ITU grid to an accuracy of ±0.1 GHz.

Accordingly, the coarse tuning enables the selection of the desired differential in the channel spacing at second coupler 105, relative to the channel spacing at first coupler 104. Although tuning by this technique is "coarse", it is also useful to precisely tune the FSR using the $CO_2$ laser as mentioned before. To this end, a small error in FSR will accumulate into a larger error from the ITU channel grid. For example, suppose the FSR error is on the order of 1 GHz, and first channel is in alignment with a chosen ITU grid. If uncorrected, the 40-th channel will be off from the ITU grid by about 40 GHz, which is clearly not acceptable The fine tuning afforded by the application of a laser via window 107 enables the suitable fine tuning of the phase delay (e.g., the selection of $\Phi_0$ which enables the alignment of the center wavelengths of the n channels of the optical signal to a particular preset wavelength. For example, if a standard ITU grid is chosen, the variation of the index of refraction via the use of the application of a laser enables the accurate alignment of the wavelength channels to the selected ITU grid. Again, the accuracy of the alignment comes with the feedback control using the real-time measurement of the frequency transmission characteristics of the device during the fabrication process. The accuracy is may be approximately ±1 GHz or better. Moreover, it is noted that in addition to the fine-tuning to effect the alignment of the individual channels, the use of the laser to alter the index of refraction can be beneficial in maintaining the accuracy of the phase delay prior to and during deployment of optical apparatus 100. This "trimming" of the optical fibers after their disposition on the substrate before the final packaging may be useful because the stress conditions may be different than when it is held in the fabrication jig. The substrate can include clearance holes (not shown) such that a $CO_2$ laser beam may still be used the trim the fibers.

As can be readily appreciated by one having ordinary skill in the art, the sinusoidal response function of the interleaver may not be desirable when multiple interleavers/deinterleavers are cascaded. For example, the resulting passband of the total cascaded deinterleaver response becomes too narrow. Therefore, it is useful to have flat-top response or passband for each wavelength channel. In addition to having a 'flat top,' the ideal channel transmittance versus frequency for a particular wavelength, has substantially vertical sides, and thereby the graph of the transmittance resembles a square function. Generally the passband width is measured by the width within which the transmission is within a difference of 0.5 dB compared to the peak transmission.

One technique used to provide improve the 'squareness' sinusoidal response function is Fourier synthesis. In Fourier synthesis, higher-order harmonics (Fourier components) are used to provide the desired transmittance versus frequency for a given wavelength channel; and may be added to improve the channel passband width. To this end, the interleaver with sinusoidal response function as described in eqns. 3a and 3b provides the first-order harmonic for the desired comb shape filter function. Moreover, via Fourier synthesis, the edges of the channel passband can be made more vertical in nature, thereby improving the "stop band width."

A second order component requires a second interference region, which provides optical path length difference of twice that of the first interferometer. The ability to use high order harmonics to improve the passband width may be hindered by the practical difficulty of implementing and packaging the increasingly larger optical path length difference.

To implement the flat-top response with second order functions in accordance with an exemplary embodiment, the outputs from first stage in eqns. (3a) and (3b) pass through fibers 110, and 111, respectively. The optical path length between fiber 110 and 111 is exactly twice that of the first stage. A third directional coupler 109 coherently combines the two properly delayed signals and produces outputs at its output ports 112, and 113. Quantitatively, the electrical components of the two optical signals at output ports 112 and 113 may be expressed as:

$$\begin{pmatrix} E_1 \\ E_2 \end{pmatrix} = \begin{pmatrix} \sqrt{a3} & j\sqrt{1-a3} \\ j\sqrt{1-a3} & \sqrt{a3} \end{pmatrix} \begin{pmatrix} 1 & 0 \\ 0 & \exp(j4\pi f\Delta + j\phi_2) \end{pmatrix} \quad (5)$$
$$\begin{pmatrix} \sqrt{a2} & j\sqrt{1-a2} \\ j\sqrt{1-a2} & \sqrt{a2} \end{pmatrix} \cdot \begin{pmatrix} 1 & 0 \\ 0 & \exp(j2\pi f\Delta + j\phi) \end{pmatrix}$$
$$\begin{pmatrix} \sqrt{a1} & j\sqrt{1-a1} \\ j\sqrt{1-a1} & \sqrt{a1} \end{pmatrix} \begin{pmatrix} 1 \\ 0 \end{pmatrix}$$

where $E_1$ and $E_2$ are the electric field components in the fibers 110 and 111, respectively; f is the optical frequency, a1, a2, and a3 are the coupling coefficients of the first, second, and the third directional couplers, respectively; $\phi$ is the phase difference between the optical paths bounded by coupler 1 and coupler 2, and $\phi_2$ is the phase difference between the optical paths bounded by coupler 2 and coupler 3, the optical path length difference $\Delta=1/FSR$.

The intensity output from the two outputs are:

$$\begin{pmatrix} T_1 \\ T_2 \end{pmatrix} = \begin{pmatrix} |E_1|^2 \\ |E_2|^2 \end{pmatrix} = \begin{pmatrix} |E_1|^2 \\ 1-|E_1|^2 \end{pmatrix} \quad (6)$$

As described in further detail below, the fused fiber interleaver/deinterleaver in accordance with exemplary embodiments has the advantage of being comparatively low loss and adjustable in real-time. Reference to eqns. 5 and 6 is used to illustrate the process to achieve the desired optical performance.

Figure 2:
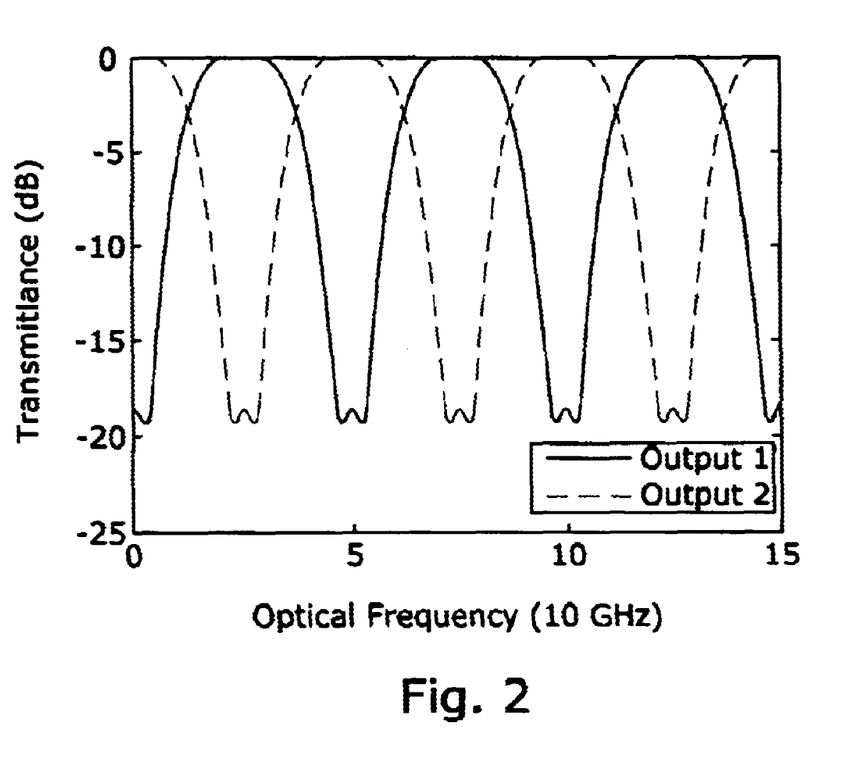
FIG. 2 is a graphical representation of the transmittance versus frequency for a plurality of channels of a three-coupler interleaver/deinterleaver in accordance with an exemplary embodiment of the present invention.

Referring to FIG. 2, the frequency responses of the outputs of a three-coupler 50 GHz FSR interleaver is shown. Optical channels with 25 GHz channel spacing can be separated or combined.

Figure 3:
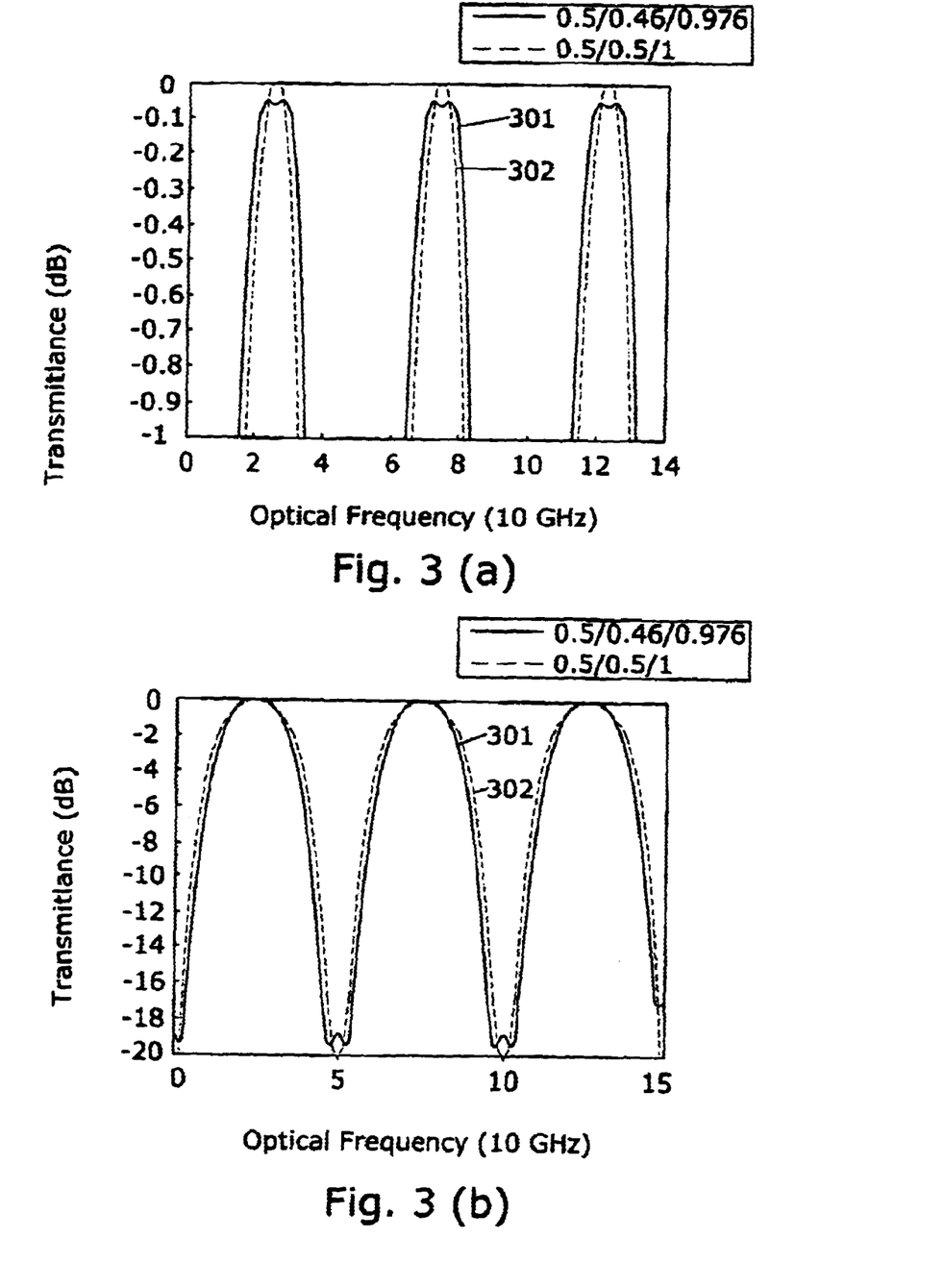
FIG. 3(a) is a graphical representation of the transmittance versus frequency for a two coupler and a three-coupler interleaver/deinterleaver in accordance with an exemplary embodiment of the present invention.
FIG. 3(b) is a graphical representation of the transmittance versus frequency for a two coupler and a three-coupler interleaver/deinterleaver in accordance with an exemplary embodiment of the present invention.

FIGS. 3(a) and 3(b) show the frequency responses of a two-coupler sinusoidal interleaver 301 and a three-taper interleaver 302. It is noted that the coupling coefficients of the two and three coupler interleavers of FIGS. 3(a) and 3(b) differ in their coupling coefficients (indicated in the legend of the graphs as a1/a2 and a1/a2/a3 for the two and three coupler interleavers, respectively). As can be readily appreciated from a review of FIGS. 3(a) and 3(b), the pass and stop bands of the three taper (coupler) interleaver is significantly improved when compared to the two-taper interleaver.

Figure 4:
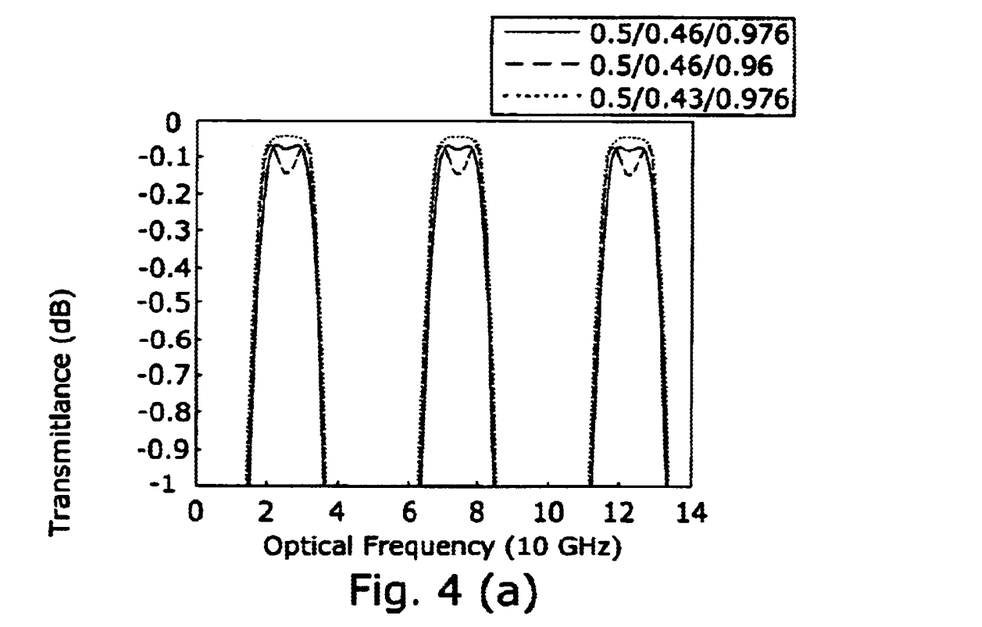
FIG. 4(a) is a graphical representation of the transmittance versus frequency for a three-coupler interleaver/deinterleaver having various combinations of coupling coefficients in accordance with an exemplary embodiment of the present invention.
FIG. 4(b) is a graphical representation of the transmittance versus frequency for a three-coupler interleaver/deinterleaver having various combinations of coupling coefficients in accordance with an exemplary embodiment of the present invention.

FIGS. 4(a) and 4(b) show the optical frequency responses for varies combination of coupling coefficients of three coupler interleavers in accordance with an exemplary embodiment of the present invention. As can be appreciated from a review of FIG. 4(a), the channel passbands of the illustrative interleaver have more pronounced differences in the stop band characteristics. In this illustrative embodiment, the third coupler is essentially a tap coupler.

Figure 5:
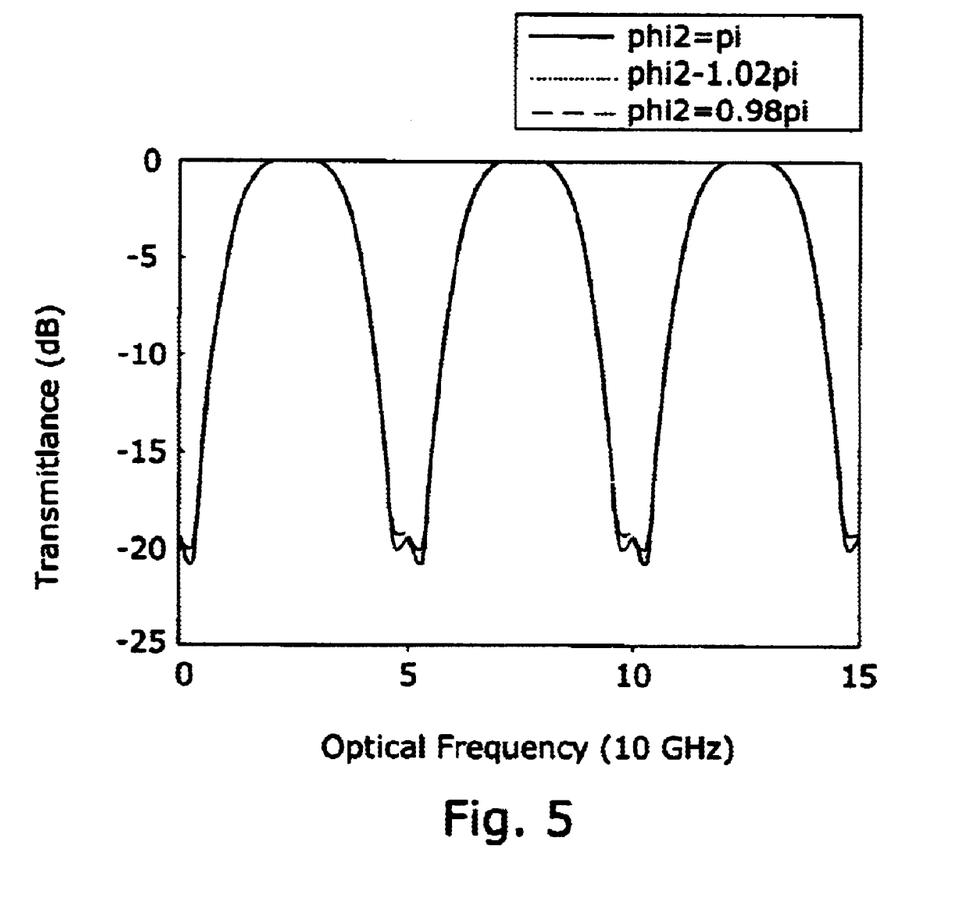
FIG. 5 is a graphical representation of the transmittance versus frequency for a three-coupler interleaver/deinterleaver illustrating the effect of the phase deviation in the optical path lengths between the second and the third couplers in accordance with an exemplary embodiment of the present invention.

FIG. 5 shows the effect of the phase deviation in the optical path lengths between the second and third couplers. A small phase error can be identified by the stop band characteristics.

In practice, the coupling coefficients can be tailored to specific device requirements in terms of stop bandwidth, and or pass bandwidth at a certain dB level. This can be modeled by using eqn. (6) and numerically searching the parameter space to achieve desired frequency response.

It follows from eqn(6) that the parameters that are useful to building a flat-top interleaver are the coupling coefficients a1, a2, and a3, and the optical path length differences between coupler 1 and coupler 2, and that between coupler 2 and coupler 3. These include $\Delta_1$, $\Delta_2$, and $\phi$, $\phi_2$.

Illustratively, the fabrication sequence may be as follows. First, the first optical coupler 104 is fabricated using a chosen coupling coefficient a1. Next, the second optical coupler 105 is fabricated using the output fibers from first optical coupler 104 with an offset length (OPL difference) to create an optical path length difference approximately equal to (1/FSR). Next, the optical frequency response of the sinusoidal outputs is observed and used as a feed back to fine tune a2 and $\Delta 1$, $\phi$ to achieve the desired FSR and center wavelength, as discussed previously.

Thereafter, the third optical coupler 109 is fabricated using the output fibers from the second optical coupler 105 with an offset length chosen to create an optical path length difference approximately equal to (2/FSR). Again, the optical frequency response of the sinusoidal output is measured and used as a feedback to fine tune a3 and $\Delta_2$, $\phi_2$ to achieve the desired passband flatness and stop bandwidth. Given the experimentally measured frequency response, fitting the data to eqn.(6) can retrace parameters and thus provide a real-time feedback for trimming the coupling coefficients and the path length difference/phase.

It is noted that a fourth taper may be further added in the same fashion to provide still flatter passband and stopband by introducing additional Fourier components. The number of tapers is limited to the packaging of the increased optical path length difference and the increased number of tuning parameters. In most applications, three tapers (couplers) are sufficient to achieve a substantially flat-top frequency response.

The invention having been described in detail in connection through a discussion of exemplary embodiments, it is clear that modifications of the invention will be apparent to one having ordinary skill in the art having had the benefit of the present disclosure. Such modifications and variations are included in the scope of the appended claims.

We claim:

1. An optical interleaver/deinterleaver, comprising:
a substrate having at least one window therein; and
a first optical fiber and a second optical fiber disposed over said substrate, said first optical fiber and said second optical fiber being coupled at at least two locations to form optical couplers at each of said at least two locations, and wherein said first optical fiber has a first length between said two locations and said second optical fiber has a second length between said two locations, said first length being less than said second length wherein said first length of said first optical fiber is disposed over said window.

2. An optical interleaver as recited in claim 1, wherein the interleaver further comprises at least one input and at least two outputs, and each of said at least one inputs is adapted to receive and optical signal having a plurality of optical channels having a first channels spacing, and each of said at least two outputs output said plurality of optical channels, which have a second channel spacing that is an integral multiple of said first channel spacing.

3. An optical interleaver as recited in claim 2, wherein said plurality of optical channels at said at least two outputs are aligned to a particular grid within a tolerance.

4. An optical interleaver as recited in claim 3, wherein said tolerance is approximately ±1.0 GHz.

5. An optical interleaver as recited in claim 2, wherein said integral multiple is two.

6. An optical interleaver as recited in claim 5, wherein said first channel spacing is chosen from the group consisting essentially of: 400 GHz, 200 GHz, 100 GHz, 50 GHz, 25 GHz, and 12.5 GHz.

7. An optical interleaver as recited in claim 2, wherein said plurality of optical channels output at said at least two outputs have a substantially flat transmittance over their respective passbands.

8. An optical interleaver as recited in claim 1, wherein said first and said second optical waveguides are optical fibers.

9. An optical interleaver as recited in claim 8, wherein said optical fibers are substantially identical.

10. An optical interleaver as recited in claim 1, wherein the interleaver is cascaded to at least one other interleaver.

11. An optical interleaver as recited in claim 1, wherein said window is adapted to receive light from a laser, which alters respective indices of refraction of said first and second optical waveguides.

12. A method of interleaving/deinterleaving optical signals, the method comprising:
providing a first optical waveguide and a second optical waveguide, which is coupled to said first optical waveguide at at least two locations; and
adjusting a length of said second optical waveguide to coarsely adjust a channel separation, and applying laser energy to said first optical waveguide to finely adjust said channel separation.

13. A method as recited in claim 12, wherein the method further comprises applying laser energy to said second optical waveguide to finely adjust said channel separation.

14. A method as recited in claim 13, wherein said applying of said laser energy alters an index of refraction of said second optical waveguide.

15. A method as recited in claim 13, wherein said fine adjustment further comprises aligning a center wavelength of each of a plurality of channels to a grid within a tolerance.

16. A method as recited in claim 12, wherein said fine tuning further comprises aligning a center wavelength of each of a plurality of channels to a grid within a tolerance.

17. A method as recited in claim 16, wherein said tolerance is approximately ±1.0 GHz.

18. A method as recited in claim 16, wherein said tolerance is approximately ±1.0 GHz.

19. A method as recited in claim 12, wherein the method further comprises: providing at least one input and at least two outputs, wherein each of said at least one inputs is adapted to receive and optical signal having a plurality of optical channels having a first channels spacing, and each of said at least two outputs output said plurality of optical channels, which have a second channel spacing that is an integral multiple of said first channel spacing.

20. A method as recited in claim 19, wherein said integral multiple is two.

21. An optical interleaver as recited in claim 20, wherein said first channel spacing is chosen from the group consisting essentially of: 400 GHz, 200 GHz, 100 GHz, 50 GHz, 25 GHz, and 12.5 GHz.

22. A method as recited in claim 12, wherein the method further comprises adjusting said length of said second waveguide to coarsely adjust said channel separation.

23. A method as recited in claim 12, wherein said applying of said laser energy alters an index of refraction of said first optical waveguide.

24. A method as recited in claim 12, wherein said first and said second waveguides are substantially identical optical fibers.

25. A method as recited in claim 12, wherein said first and said second waveguides are optical fibers.

* * * * *